April 30, 1963 O. NEISS 3,087,210
STEAM PRESSURE STERILIZING DEVICES FOR MEDICAL PURPOSES
Filed Sept. 20, 1960 2 Sheets-Sheet 2

INVENTOR:
Oskar Neiss,
by Singer, Stern & Carlberg
Attorneys.

United States Patent Office 3,087,210
Patented Apr. 30, 1963

3,087,210
STEAM PRESSURE STERILIZING DEVICES FOR MEDICAL PURPOSES
Oskar Neiss, Hamburg-Volksdorf, Germany, assignor to American Sterilizer Company, Erie, Pa.
Filed Sept. 20, 1960, Ser. No. 57,212
Claims priority, application Germany Sept. 21, 1959
8 Claims. (Cl. 21—93)

Steam pressure sterilizing devices for medical purposes have for a long time been fully automatically driven, the different phases of the processes being controlled in dependence on each other, the time and the temperature. Very dissimilar systems have been developed.

Basically, however, that system has been selected which has a fixedly adjusted programme which cannot be altered by outside influences. In this case the time or the operating condition of the individual phases, such as, e.g., initial vacuum, steam, drying and airing, is a predetermined period, such as for example is described in German specification No. 830,998.

The new advances in bacteriology result in ever higher and newer requirements in the methods of sterilization. These requirements involve temperature, pressure, time or the combination of gases. For a few fixed sterilizing programmes, so-called standard programmes have been put together. Alteration of such programmes is however limited, since the use of conventional switching and control elements such as relays etc. in a finished apparatus which is in service can only be carried out by structural alterations. The costs of such previously known programme controls with e.g. three fixed programmes can amount to ⅓ of the total cost of the apparatus. Furthermore, the maintenance of such very complicated switching apparatus is very clostly and the provision of spare parts is very difficult because of the special construction.

With the present invention, these disadvantages are avoided. The present invention uses a programme sender on which the programmes can be stored in any number and combination. Storage of the programmes can be carried out magnetically using soft-magnetic material in the form of bands and cores, electrically using so-called programme card originators, mechanically with cam rollers or magnetically/electrically. This part is referred to as programme store. These programme stores are advantageously arranged in a selector device which enables individual programme stores to be brought selectively into the operative position of the programme sender, in which position the respective programme store actuates a control device for the sterilization device. Thus, all desired programmes can be ready and available or can be set up in a few minutes.

There is provided a combination of a sterilizing device with valves arranged independently, which valves form the control device which remains the same for all programmes, and a programme sender which holds ready several programme stores, for actuating the control device in accordance with a selected programme. In addition, modification of a sterilization programme so combines the sequence of actuation of valves, the time effects of steam, gases or temperatures, and pressures in their time duration that the required new bacteriological effects are obtained.

According to the invention, it is possible to accomplish this without alteration of the art of the apparatus. One embodiment of this invention requires that the valves associated with a sterilization process for controlling vacuum, air, steam or gas are not connected to one another by rigid shafts but that all such switching devices must be able to be controlled independently of one another. For this reason, driving by a drive material, e.g. vacuum, is most suitable, the control impulses made available by the programme store being converted in order to control the valves by intermediate means or to carry out controls and switchings. In this way, the costs of such a control amount to only about ½₀ of the total price of the apparatus.

The sterilization method most used is the so-called prevacuum method. In this case it is very important that a minimum vacuum of 96% is achieved before the steam enters. The methods of carrying out this control previously comprised using a vacuum meter with a contact device. This always involves an apparatus which should both indicate the vacuum of 96% and also register the steam pressure (3 atmospheres) which subsequently exists in the apparatus. These apparatus register the 96% vacuum very unreliably. According to a further embodiment of the present invention, the vacuum is registered by a mercury column which indicates the vacuum accurately to 1 mm. and is so incorporated in the course of the programme that on the application of pressure in the autoclave it is separated therefrom. The mercury column therefore only indicates the vacuum and is open to the atmosphere during the steam phase.

An embodiment of the invention using mechanical and electrical control is described below with reference to the accompanying drawings, in which.

Figure 1:
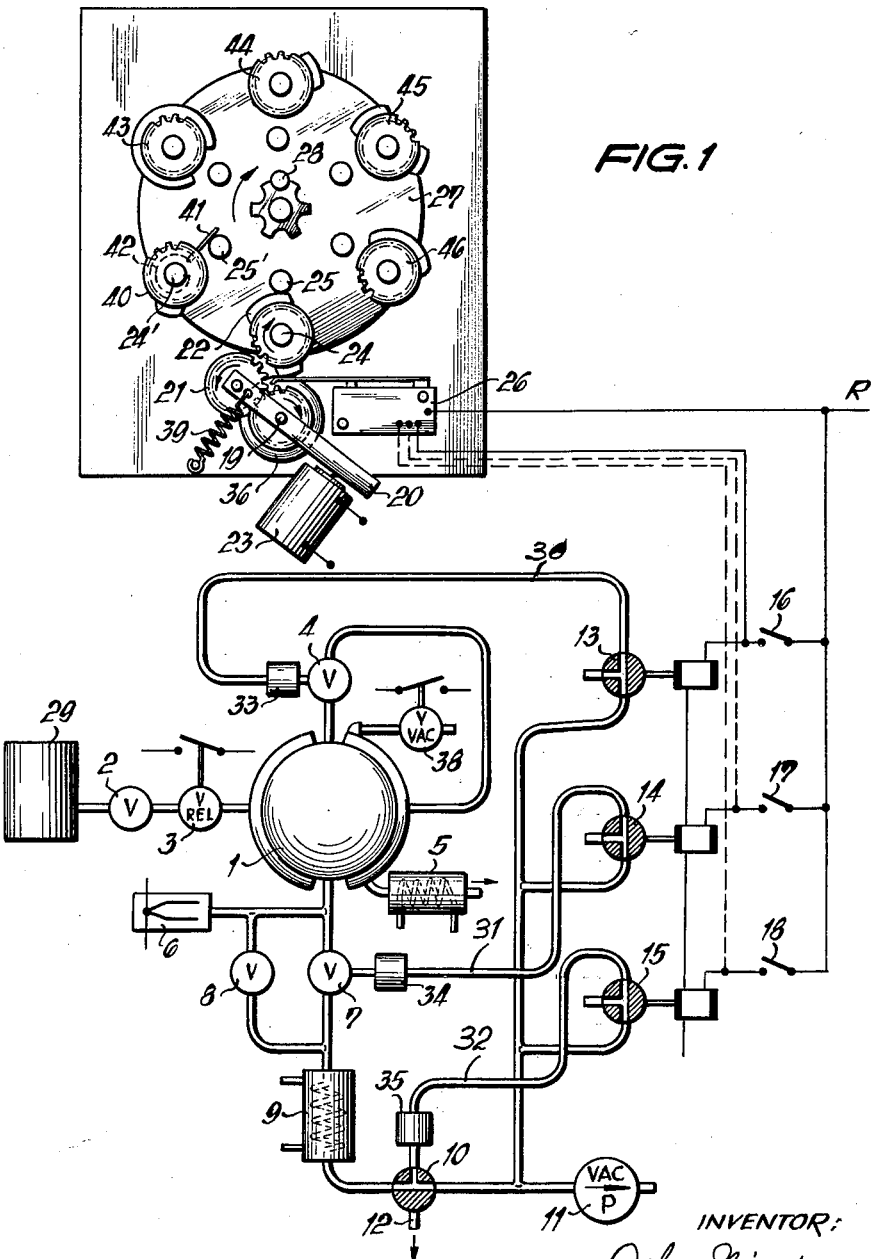
FIG. 1 shows a schematic view of the device according to the invention.

The steam pressure sterilizing device comprises, as is well known, an autoclave 1 to which steam at a predetermined pressure is led through a double cover from a steam source 29, through an interposed cut-off valve 2 and a pressure control 3. The pressure control 3 controls the closing switch for the control circuit as described hereinafter. The steam flows into the autoclave through a valve 4. A condensation remover 5 serves for the drainage of the steam. At the autoclave 1 there is furthermore provided a vacuum control 38 which is so constructed that it is disconnected from the autoclave when steam is led into the outoclave.

After passage through the autoclave, the steam flows past a temperature control 6 through a valve 7 or a bypass 8 for this valve. In the condenser 9 the steam condenses and flows past the valve 10 to the vacuum pump 11. The valve 10 is a 3-way valve such that on one adjustment thereof the condensate passes directly from the device through the conduit 12. The valves 4, 7 and 10 are driven by vacuum. The vacuum is led to the three solenoid valves 13, 14 and 15, the valves 4, 7 and 10 being connected to these valves. For control of the valves 4, 7 and 10 there are valve adjustment devices 33, 34 and 35 controllable by vacuum. The connection conduits between the vacuum pump and the valves are pipes 30, 31 and 32, each having an inner diameter of about 3 mm. The solenoid valves 13, 14, 15 can be controlled manually by switches 16, 17, 18 or by an automatic device. This automatic device comprises essentially an ordinary driving device.

Usually, such driving gears can have a drive shaft 19 rotating once in 60 minutes. The driving gear in the illustrated embodiment has a drive shaft 19, the rotation of which can be imparted, by means of a solenoid coupler 23, to a pinion 21 which drives a programme originator, e.g. a cam shaft 22, a programme card or a magnetic store element, when the magnet 23 has pulled the arm 20. The cam shaft 22 can be drivingly replaced on the carrier 24.

The arm 20 is of course mounted rotatable about the shaft 19. The drive motor 36 is in driving connection with this shaft. A gear wheel arranged on the shaft constantly drives the gear wheel 21 which can be brought into engagement with a corresponding gear wheel on the cam shaft 22 when the arm 20 is swung clockwise. In the initial position, the pinion is withdrawn by the spring 39 from the gear wheel of the cam shaft. On energisation of the solenoid coupler 23, the arm 20 is rotated clockwise and the pinion is brought into engagement with the gear wheel of the cam shaft so that the cam shaft is driven in the direction shown by the arrow.

In the initial position the cam shaft 22 lies under spring force on an abutment 25. This is schematically illustrated by the cam shaft 40, on which the abutment 41 is in engagement with the abutment 25'. Between the carrier 24' and the cam shaft 40 there is provided a spring 42 which holds the abutments 41 and 25' together. The cam shaft is so constructed that the whole programme is controlled by one rotation of slightly less than 360°, i.e. until the abutment 41 bears on the opposite side of the cam. If the cam shaft is then further set free by release of the solenoid coupler, the spring 42 draws the cam shaft back into the initial position. The cams, during one rotation, actuate the microswitches 26 which control the solenoid valves. The cam shaft comprises cams corresponding in number to the valves to be controlled with its microswitches and other functions, which cams in their sequence and in their time adjustments carry out the predetermined programme through their associated solenoid valves.

In the present embodiment six cam shafts 22, 40, 43, 44, 45, 46 are arranged on a selector disc 27 with a click-stop device 28. Each cam shaft comprises, corresponding to their particular arrangement and construction, the individual cams of a predetermined programme. They can be brought in accordance with their programme into the functional position by the main shaft of the driving device. One can for example set up:

One sterilization programme for laundry and dressings,
One sterilization programme for instruments,
One brief sterilization programme for individual instruments,
One sterilization programme for gloves,
One sterilization programme for solutions,
One sterilization programme for pasteurisation.

Since the cam shaft according to the invention is drivingly replaceable, practically any desired sterilization programme can be made ready with few alterations in an existing device, the selector disc 27 being so rotated that the selected cam shaft is brought into the position in which the cam shaft 22 is located in FIG. 1. The click-stop device is so constructed that one cam shaft at a time is locked in this position. The exact construction of the click-stop device is not the subject matter of the invention, so further description thereof is not considered necessary and this arrangement is only shown schematically in FIG. 1.

Figure 2:
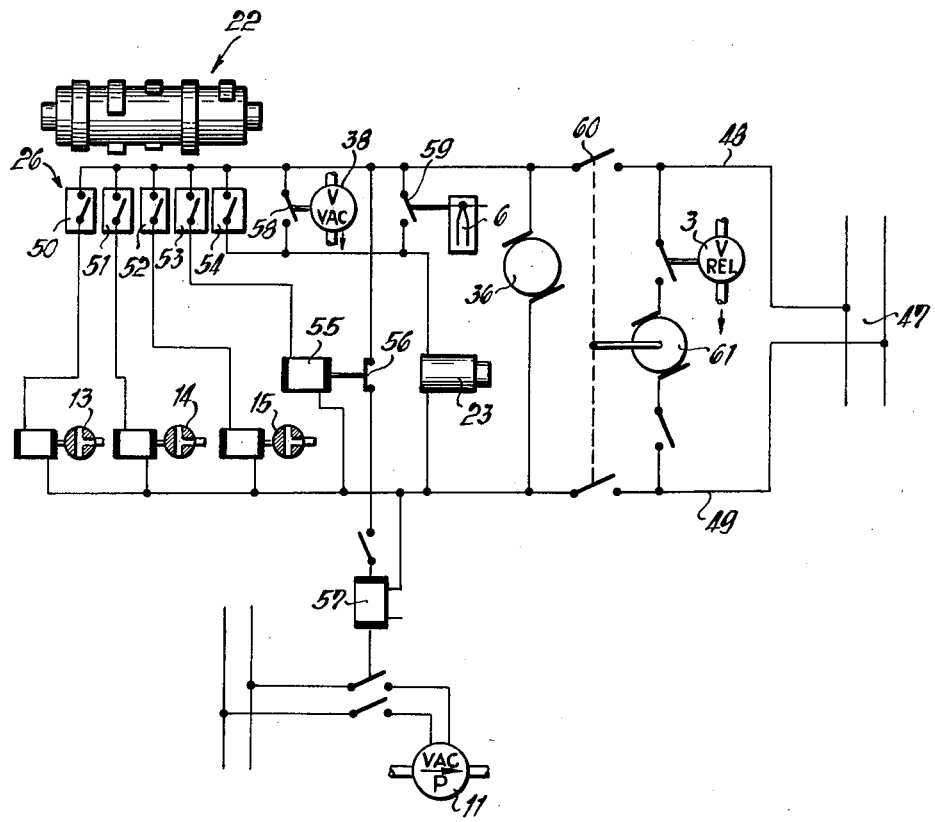
FIG. 2 shows a circuit diagram for assisting understanding of the co-operation of the parts shown in FIG. 1.

FIG. 2 shows a circuit diagram. From a source 47, two phases 48, 49 are taken between which the driving voltage is tapped. Fuse and switching devices are provided at the source 47.

From FIG. 2 it can be seen that for the arrangement according to FIG. 1 five microswitches 50, 51, 52, 53, 54 are provided, which are arranged adjacent one another beneath a cam shaft 22. The row of microswitches is indicated in FIG. 1 by reference numeral 26.

The microswitches 50 to 52 control the solenoid valves 13, 14, 15. The microswitch 53 serves to control a relay 55 which can actuate a locking contact 56 in the energisation circuit of the solenoid switch 57 for the vacuum pump 11. The microswitches 50 to 53 are normally open and are closed by cam actuation. In contrast thereto, the microswitch 54 is normally closed and is opened by cam actuation. The solenoid coupler 23 is connected to the microswitch 54. Contacts 58, 59 are connected in parallel to this microswitch 54, which contacts are actuated by the vacuum control 58 or the temperature control 6.

Furthermore, the circuit is adjustable by a switch 60 arranged to be actuated by a switch operating device 61, the pressure control 3 being arranged to control energisation of the latter so that the switch 60 can only be closed when sufficient steam pressure is available.

In operation, firstly the vacuum pump 11 is driven by closing the switch 57, and the switch 60 is then closed. The sequence can be ensured by known locking arrangements. The motor 36 runs for driving the cam shafts and simultaneously the solenoid coupler 23 is switched in by the normally closed microswitch 54 so that the programme begins.

On energisation of the vacuum pump 11, a vacuum is applied to the solenoid valves 13, 14, 15. Simultaneously the driving mechanism is set in motion. It is assumed for these switchings that the pressure control 3 is closed by the predetermined steam pressure. On closing of the switch 60, the solenoid coupler 23 is energised and the arm 20 is moved so that the pinion 21 on the drive wheel is in engagement with the cam shaft 22. That is the beginning of the programme. On movement of the cam shaft, the microswitch 51 is closed and the control element 14 applies vacuum to the valve 7 so that the latter is opened. The autoclave is then evacuated. The evacuation time is determined by the cam controlling the microswitch 51 for actuating the solenoid valve 14.

Shortly before the end of this time the microswitch 54, which applies a voltage to the solenoid coupler 23, is opened by appropriate shaping of the cam actuating it. The contact 58 of the vacuum control 38 is connected parallel to the contact of the microswitch 54 or to a holding contact controlled thereby, the vacuum control 38 registering the vacuum of the autoclave. If sufficient vacuum has been reached, the vacuum control takes over the function of the opened holding contact of the solenoid coupler 23. After a short moment the holding contact is again closed by the cam associated with microswitch 54.

If sufficient vacuum has not been reached, the solenoid coupler 23 is no longer energised and its arm 20 rotates anticlockwise and the cam shaft moves under the spring force into its initial position. The sterilization process is then repeated automatically. If the cam shaft 22 runs uniformly in the normal way, the vacuum valve 7 is closed and the steam valve 4 is opened after the pre-vacuum time. Steam now flows into the autoclave. The temperature is controlled by the temperature control 6 which controls the steam flow through the by-pass 8. The contact 59 controlled by the temperature control 6 is likewise connected parallel to the microswitch 54 or to a holding contact controlled thereby for the solenoid coupler 23. Shortly before the end of the steam period, the contact of the microswitch 54 is opened by cam control for a short time in order to carry out the temperature control. If the required temperature is not reached, i.e. if the contact 59 is open, the solenoid coupler 23 is disengaged and the cam shaft rotates back to the initial position, whereupon sterilization is repeated.

If the steam process is satisfactorily completed, the live steam valve 4 is closed by actuation of the microswitch 50 and the vacuum valve 7 is again opened by actuation of the microswitch 51 for carrying out the drying process. The end of the programme is determined by the cam for the holding contact 56 of the solenoid switch 57 for the vacuum pump 11, since on stopping of the vacuum pump no drive means is available for actuation of the valves. Actuation of the holding contact 56 is carried out by the microswitch 53.

If valves are now to be actuated in another relative sequence according to another programme or if their programme times are to be different, the corresponding cam shaft can be brought into the functional position by the selector 27. The cam shafts simultaneously also undertake changing of high steam pressures to low steam pressures.

It can happen that a programme has to be carried out manually. For this purpose, each magnet valve associated with a steam valve can be manually switched.

It can also happen that the apparatus must remain functioning in spite of current breakdowns. Instead of the vacuum pump, a water-jet pump can then be used to produce a vacuum of about 80%. This vacuum is sufficient to actuate the valves 4, 7 and 10. For this purpose, the solenoid valves 13, 14 and 15 are arranged parallel to two-way valves mechanically actuated by hand. One can also carry out the sterilization process by these valves.

The automatic drive of the autoclave can only be initiated when the door of the autoclave is closed. This is important on safety grounds, since otherwise there is a possibility that live steam can enter into the autoclave when the door is open and injure the operator. All automatically driven sterilizing devices must however also be able to be driven by hand. Thus, it must also be ensured that when the door is open the live steam valve cannot be opened by hand. It is a feature of the present invention that during hand driving and while the door is open, the live steam valve 4 cannot be opened since the opened autoclave does not allow the build up of a vacuum at the pump.

I claim:

1. In a device for automatically controlling a steam pressure sterilization apparatus, an autoclave, a source of steam, steam conduit means connecting said source of steam with said autoclave, valve means in said steam conduit means, first regulating means connected with said valve means for controlling the supply of steam to said autoclave, a source of vacuum, vacuum conduit means connecting said source of vacuum with said autoclave, second regulating means in said vacuum conduit means for controlling discharge of steam from said autoclave and creation of vacuum therein, control means for selective actuation of said first and second regulating means, a rotatably mounted program selector means, a plurality of programming means movably mounted on said program selector means and each representing a predetermined fixed program, drive means for said programming means, means for releasably locking said program selector means with a selected one of said programming means in position for operative engagement with said drive means and control means, actuating means for operatively engaging said drive means with said one selected programming means, condition sensitive means associated with said autoclave and connected in parallel with said actuating means to release said actuating means in dependence upon the conditions prevailing in said autoclave, and return means in each of said programming means for returning the released programming means to its starting position, so that an erroneous condition in said autoclave causes the active programming means to return to its starting position to begin the program anew.

2. The device as set forth in claim 1, including stop members on said program selector means and abutment means on each of said programming means adapted to establish said starting position for the latter by engagement with said stop members.

3. The device as set forth in claim 1, in which each of said first and second regulating means is provided with an actuating member connected in a conduit which includes a control valve and is connected to a common branch conduit from one of said sources connected with the autoclave.

4. The device as set forth in claim 3, in which said branch conduit is connected with said source of vacuum.

5. The device as set forth in claim 3, in which said regulating means are arranged decentralized on said autoclave.

6. The device as set forth in claim 1, in which said actuating means comprises an electromagnet having an energizing contact adapted to be closed and opened in dependence upon the program, said energizing contact being connected in parallel with at least one other contact which is actuatable by said condition sensing means.

7. The device as set forth in claim 6, in which said condition sensing means comprises a vacuum actuated means which is connected with said autoclave during the vacuum phase of the operation only.

8. The device as set forth in claim 6, in which said condition sensing means comprises a temperature actuated means.

References Cited in the file of this patent

UNITED STATES PATENTS

| | | |
|---|---|---|
| 2,112,639 | Underwood | Mar. 29, 1938 |
| 2,208,552 | Walter | July 16, 1940 |
| 2,261,494 | Elverston | Nov. 4, 1941 |
| 2,380,696 | James | July 31, 1945 |
| 2,526,974 | Schipanski | Oct. 24, 1950 |
| 2,579,598 | Morrison | Dec. 25, 1951 |
| 2,755,160 | Holmes | July 19, 1956 |
| 2,868,616 | Poitras | Jan. 13, 1959 |
| 2,889,837 | Braun et al. | June 9, 1959 |